(12) United States Patent
Iio et al.

(10) Patent No.: US 9,302,391 B2
(45) Date of Patent: Apr. 5, 2016

(54) OBJECT GRIPPING APPARATUS, METHOD OF CONTROLLING THE SAME AND STORAGE MEDIUM

(75) Inventors: Yuichiro Iio, Kawasaki (JP); Yusuke Mitarai, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 774 days.

(21) Appl. No.: 13/312,976

(22) Filed: Dec. 6, 2011

(65) Prior Publication Data

US 2012/0158180 A1 Jun. 21, 2012

(30) Foreign Application Priority Data

Dec. 15, 2010 (JP) .................................. 2010-279868

(51) Int. Cl.
*B25J 9/00* (2006.01)
*B25J 9/16* (2006.01)
*G06T 1/00* (2006.01)

(52) U.S. Cl.
CPC .............. *B25J 9/1679* (2013.01); *B25J 9/1697* (2013.01); *G06T 1/0014* (2013.01); *G05B 2219/40053* (2013.01)

(58) Field of Classification Search
CPC ......... B25J 9/1669; B25J 19/02; B25J 19/022
USPC .................................................. 701/245, 259
See application file for complete search history.

(56) References Cited

U.S. PATENT DOCUMENTS 4,402,053 A * 8/1983 Kelley et al. ................... 700/259
4,412,293 A * 10/1983 Kelley et al. ................... 700/259
(Continued)

FOREIGN PATENT DOCUMENTS

JP 01-183395 A 7/1989
JP 2000-293695 A 10/2000
(Continued)

OTHER PUBLICATIONS

Sato, et al., "Liquid Crystal Range Finder—A High-Speed Range-Imaging System Using Liquid Crystal Shutter", Systems and Computers in Japan, vol. 20, No. 8, 1989, pp. 89-100.
(Continued)

*Primary Examiner* — Thomas G Black
*Assistant Examiner* — Peter D Nolan
(74) *Attorney, Agent, or Firm* — Fitzpatrick, Cella, Harper & Scinto

(57) ABSTRACT

An object gripping apparatus includes an image capturing unit for capturing a region including a plurality of works, an obtaining unit for obtaining distance information of the region, a measurement unit for measuring three-dimensional positions/orientations of a plurality of gripping-candidate works out of the plurality of works based on the image and distance information, thereby generating three-dimensional position/orientation information, a selection unit for selecting a gripping-target work based on the three-dimensional position/orientation information, a gripping unit for gripping the gripping-target work, and an updating unit for updating the three-dimensional position/orientation information by measuring three-dimensional positions/orientations of the gripping-candidate works at a time interval during gripping of the gripping-target work. When the gripping ends, the next gripping-target work is selected based on the updated three-dimensional position/orientation information of the gripping-candidate works.

16 Claims, 8 Drawing Sheets

(56) References Cited

U.S. PATENT DOCUMENTS

| | | | |
|---|---|---|---|
| 4,486,842 A * | 12/1984 | Hermann | 700/259 |
| 4,985,846 A * | 1/1991 | Fallon | 382/153 |
| 6,328,523 B1 * | 12/2001 | Watanabe et al. | 414/416.01 |
| 6,665,588 B2 * | 12/2003 | Watanabe et al. | 700/259 |
| 6,845,296 B2 * | 1/2005 | Ban et al. | 700/245 |
| 7,123,992 B2 * | 10/2006 | Ban et al. | 700/258 |
| 7,177,459 B1 * | 2/2007 | Watanabe et al. | 382/151 |
| 7,203,573 B2 * | 4/2007 | Ban et al. | 700/258 |
| 7,313,464 B1 * | 12/2007 | Perreault et al. | 700/245 |
| 7,474,939 B2 * | 1/2009 | Oda et al. | 700/245 |
| 7,502,504 B2 * | 3/2009 | Ban et al. | 382/152 |
| 7,766,828 B2 | 8/2010 | Ishii et al. | |
| 7,844,104 B2 * | 11/2010 | Tropf | 382/153 |
| 7,957,580 B2 * | 6/2011 | Ban et al. | 382/153 |
| 7,966,094 B2 * | 6/2011 | Ban et al. | 700/260 |
| 7,983,487 B2 * | 7/2011 | Agrawal et al. | 382/199 |
| 7,996,114 B2 * | 8/2011 | Ban et al. | 700/259 |
| 8,098,928 B2 * | 1/2012 | Ban et al. | 382/153 |
| 8,295,975 B2 * | 10/2012 | Arimatsu et al. | 700/216 |
| 8,315,739 B2 * | 11/2012 | Dai | 700/259 |
| 8,472,698 B2 * | 6/2013 | Agrawal et al. | 382/153 |
| 8,504,191 B2 * | 8/2013 | Furukawa | 700/218 |
| 8,554,359 B2 * | 10/2013 | Ichimaru | 700/214 |
| 8,660,685 B2 * | 2/2014 | Irie et al. | 700/213 |
| 2004/0041808 A1 * | 3/2004 | Ban et al. | 345/419 |
| 2005/0071048 A1 * | 3/2005 | Watanabe et al. | 700/259 |
| 2006/0104788 A1 * | 5/2006 | Ban et al. | 414/729 |
| 2008/0211904 A1 | 9/2008 | Kato et al. | |
| 2008/0253612 A1 * | 10/2008 | Reyier et al. | 382/103 |
| 2011/0037984 A1 | 2/2011 | Yoshikawa et al. | |
| 2012/0165986 A1 * | 6/2012 | Fuhlbrigge et al. | 700/259 |

FOREIGN PATENT DOCUMENTS

| | | |
|---|---|---|
| JP | 3377465 B2 | 2/2003 |
| JP | 2009-128201 A | 6/2009 |
| JP | 2010-120141 A | 6/2010 |

OTHER PUBLICATIONS

Journal of IHI Technologies, vol. 48, No. 1 (Mar. 2008).
Hayashi, T., et al., "Development of Bin Picking Robotics using 3-D Object Recognition", IHI Technologies vol. 48, No. 1 (Mar. 2008), pp. 7 to 11, with English Translation.

* cited by examiner

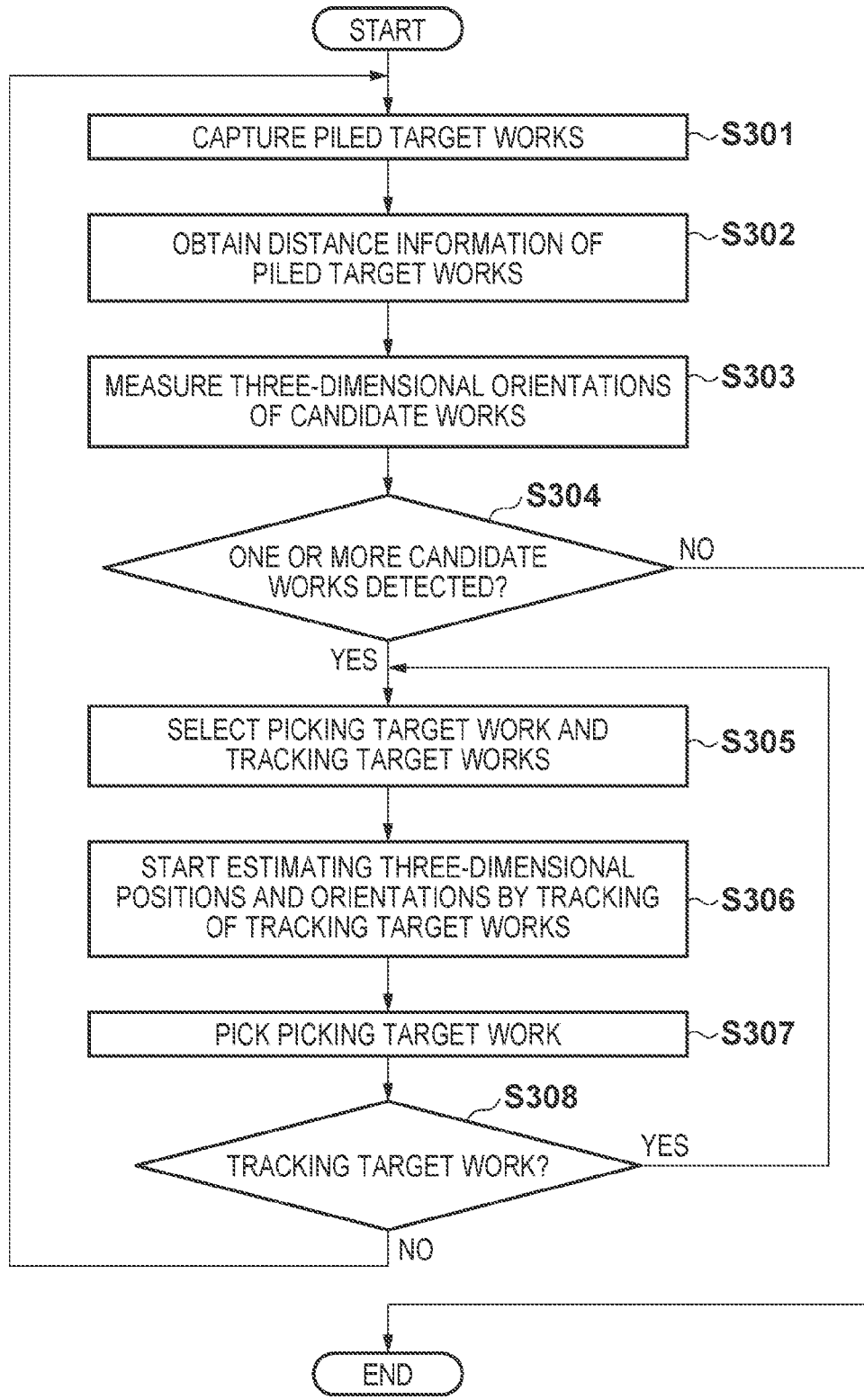

CALCULATION OF POSITION AND ORIENTATION OF ROBOT ARM UPON PICKING

DETECTION OF WORKS TO BE SHIELDED AND CALCULATION OF SUM S(i) OF SHIELDING RATIOS

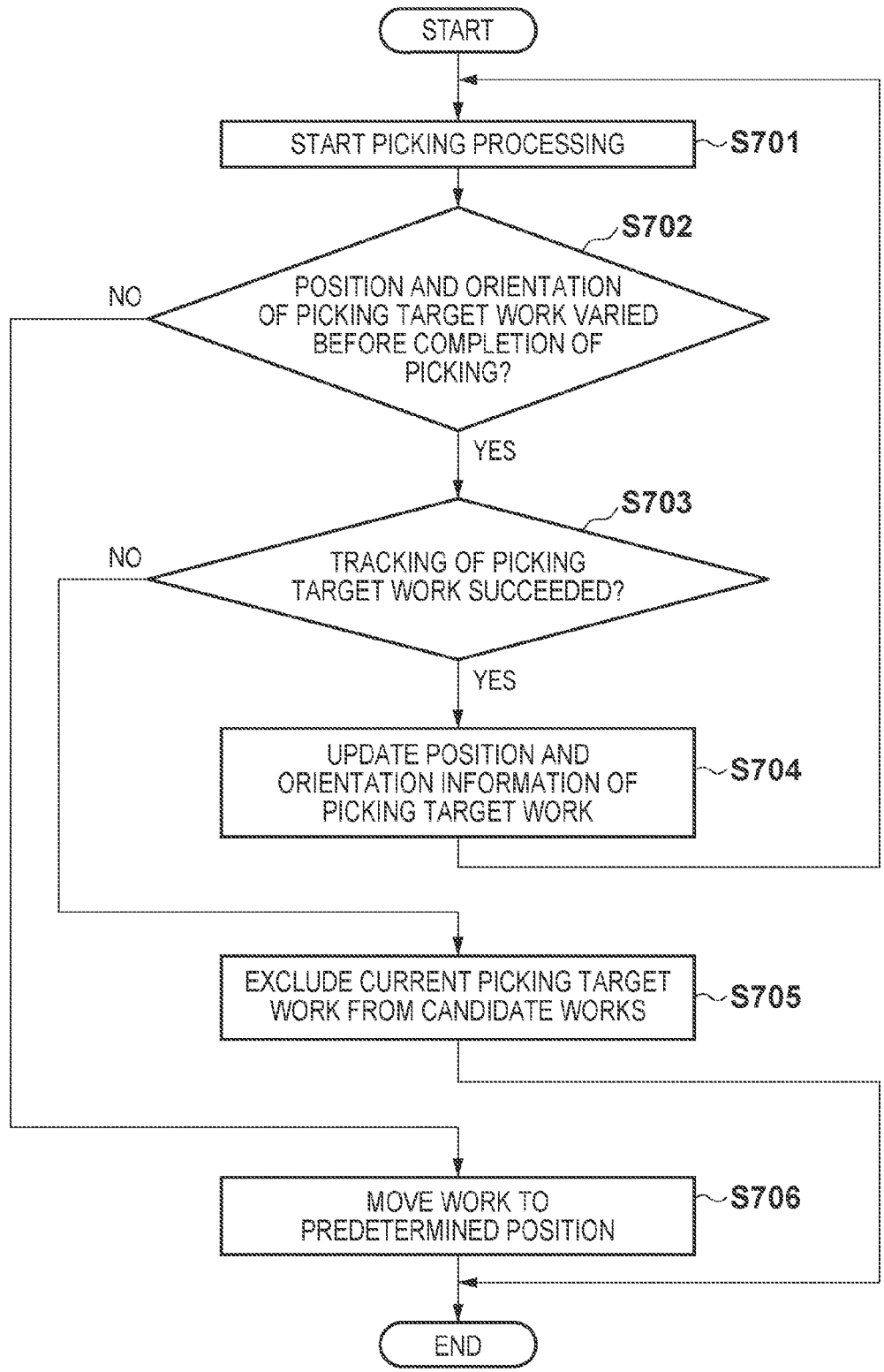

OBJECT GRIPPING APPARATUS, METHOD OF CONTROLLING THE SAME AND STORAGE MEDIUM

BACKGROUND OF THE INVENTION

1. Field of the Invention

The present invention relates to an object gripping apparatus for performing bin picking of piled works using an industrial machine such as a robot, a method of controlling the same, and a storage medium. The present invention particularly relates to an object gripping apparatus for picking works piling up irregularly on a tray while measuring their three-dimensional positions and orientations, a method of controlling the same, and a storage medium.

2. Description of the Related Art

There are many research reports about an apparatus for automatizing the part supply or assembly process by causing an industrial robot to pick works piling up irregularly on a tray. An example is Japanese Patent No. 03377465. In Japanese Patent No. 03377465, a robot performs picking by executing pattern matching using a three-dimensional model prepared in advance so as to recognize the position and orientation of a work. In Japanese Patent No. 03377465, the apparatus measures the three-dimensional position and orientation of only one work at a time. Hence, when bin-picking piled works, position and orientation measurement processing needs to be repeated as many times as the number of works stacked on the tray. To decrease the number of times of position and orientation measurement processing upon bin picking, a method of obtaining and holding the three-dimensional positions and orientations of a plurality of works by one measurement operation has been considered. In Journal of IHI technologies Vol. 48, No. 1 (2008-3), three-dimensional position and orientation recognition is done for a plurality of piled works having a complex shape.

However, when the three-dimensional positions and orientations of a plurality of works are measured at once, the measured positions and orientations of the works may vary due to interference that may occur between the robot arm and the picking target work at the time of work picking after the measurement. In this case, the work whose position and orientation have varied needs to be remeasured, resulting in time-consuming processing.

The present invention has been made in consideration of the above-described problem, and provides a technique of reducing the influence of a variation in the position and orientation of a work caused by interference upon picking.

SUMMARY OF THE INVENTION

According to one aspect of the present invention, there is provided an object gripping apparatus comprising: an image capturing unit adapted to capture an image of a region including a plurality of works; an obtaining unit adapted to obtain distance information of the region including the plurality of works; a measurement unit adapted to measure three-dimensional positions and orientations of a plurality of gripping candidate works out of the plurality of works based on the image and the distance information, thereby generating three-dimensional position and orientation information; a selection unit adapted to select a gripping target work from the gripping candidate works based on the three-dimensional position and orientation information measured by the measurement unit; a gripping unit adapted to grip the gripping target work; and an updating unit adapted to update the three-dimensional position and orientation information by measuring the three-dimensional positions and orientations of the gripping candidate works at a predetermined time interval during gripping of the gripping target work by the gripping unit, wherein when the gripping by the gripping unit has ended, the selection unit selects the next gripping target work based on the three-dimensional position and orientation information of the gripping candidate works updated by the updating unit.

According to one aspect of the present invention, there is provided a method of controlling an object gripping apparatus comprising: capturing an image of a region including a plurality of works; obtaining distance information of the region including the plurality of works; measuring three-dimensional positions and orientations of a plurality of gripping candidate works out of the plurality of works based on the image and the distance information, thereby generating three-dimensional position and orientation information; selecting a gripping target work from the gripping candidate works based on the three-dimensional position and orientation information measured in the measuring; gripping the gripping target work; and updating the three-dimensional position and orientation information by measuring the three-dimensional positions and orientations of the gripping candidate works at a predetermined time interval during gripping of the gripping target work in the gripping, wherein in the selecting, when the gripping in the gripping has ended, the next gripping target work is selected based on the three-dimensional position and orientation information of the gripping candidate works updated in the updating.

Further features of the present invention will be apparent from the following description of exemplary embodiments with reference to the attached drawings.

BRIEF DESCRIPTION OF THE DRAWINGS

FIG. 3 is a flowchart illustrating the procedure of processing of the object gripping apparatus according to the first embodiment;

FIG. 7 is a flowchart illustrating the procedure of processing of a picking execution algorithm according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the present invention, pile picking means an operation of gripping a plurality of irregularly arranged works using a robot arm functioning as an object gripping apparatus and moving them to a predetermined place. Note that at least one picking point (gripping point) to be gripped by the robot arm is set in advance for each work.

First Embodiment

An object gripping apparatus according to the first embodiment obtains the positions and orientations of a plurality of picking candidate works (gripping candidate works) in advance, and during picking (gripping) of a gripping target work, tracks and updates the positions and orientations of the plurality of remaining picking candidate works.

The processing units of an object gripping apparatus 1100 according to the first embodiment will be explained with reference to FIG. 1, and an example of the arrangement of the object gripping apparatus 1100 will be described with reference to FIG. 2. Note that the arrangement example shown in FIG. 2 is merely an example of the arrangement for implementing the object gripping apparatus of the present invention, and the arrangement is not necessarily limited to the example shown in FIG. 2.

Figure 1:
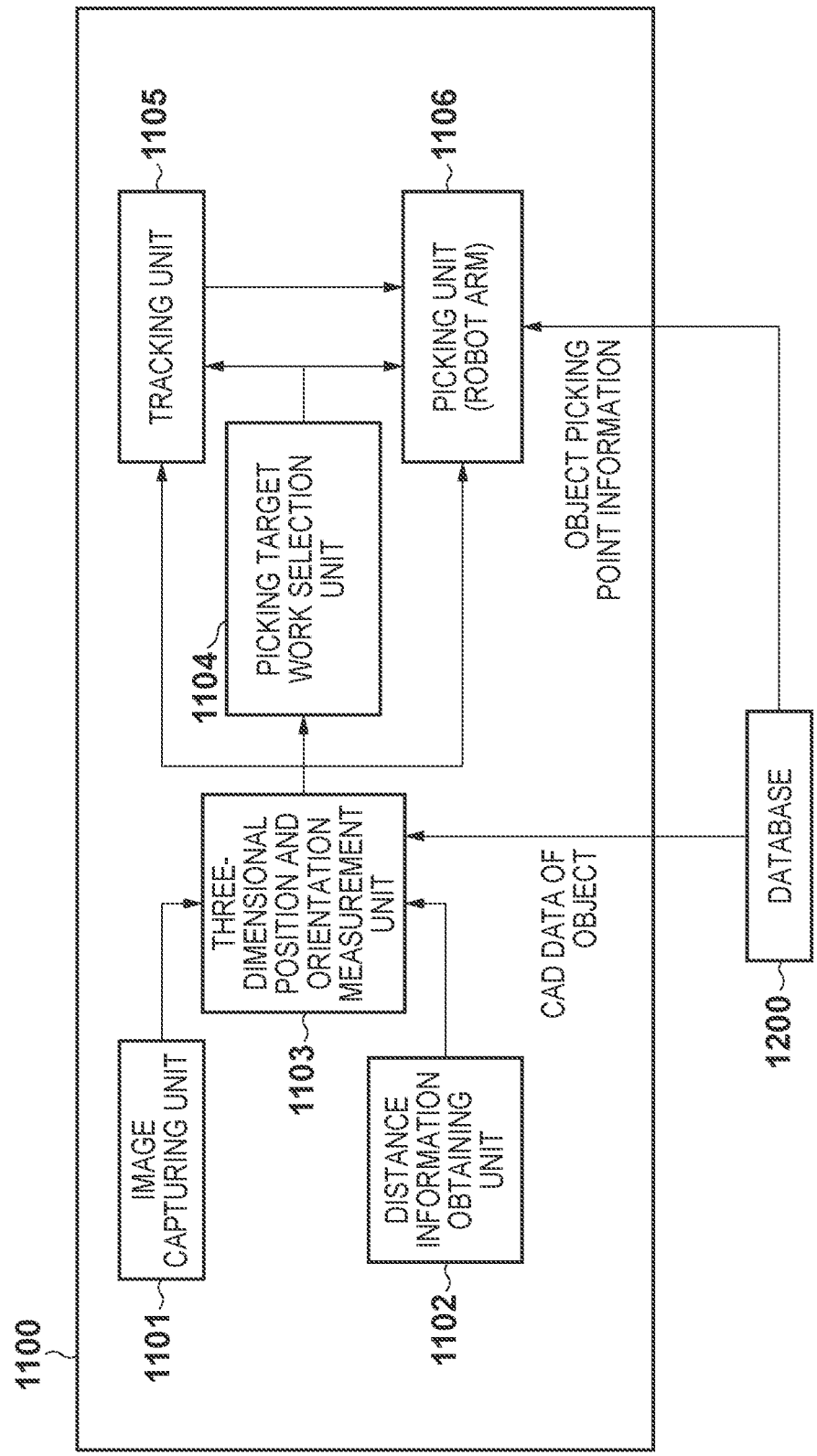
FIG. 1 is a block diagram showing an example of the arrangement of an object gripping apparatus according to the first embodiment.

As shown in FIG. 1, the object gripping apparatus 1100 includes an image capturing unit 1101, a distance information obtaining unit 1102, a three-dimensional position and orientation measurement unit 1103, a picking target work selection unit 1104, a tracking unit 1105, and a picking unit 1106. A database 1200 holds information necessary for picking. The database 1200 stores data prepared in advance, including CAD data necessary for detecting the three-dimensional position and orientation of a work and information representing a point of a target work to be picked by the picking unit 1106.

Figure 2:
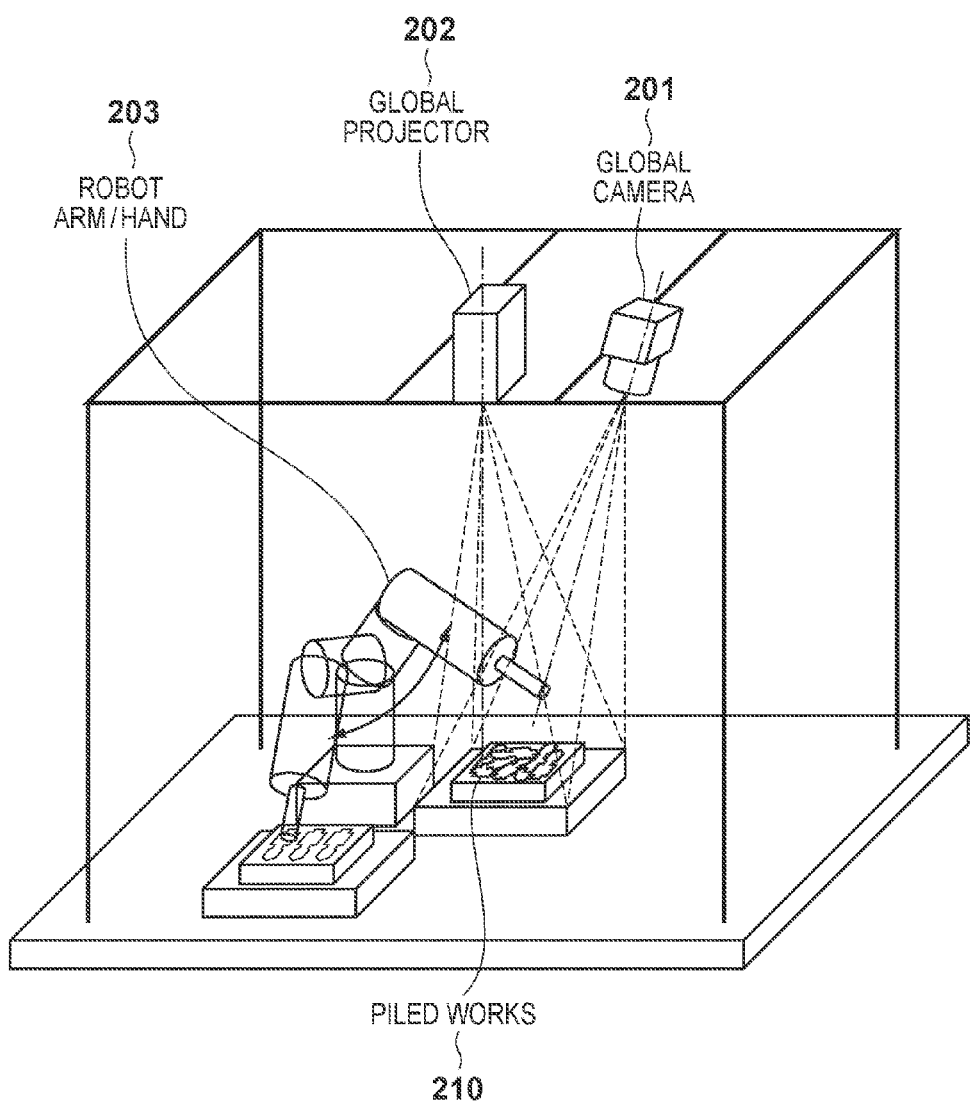
FIG. 2 is a schematic perspective view showing an example of the arrangement of the object gripping apparatus according to the first embodiment.

The image capturing unit 1101 captures a visible image of piled target works 210 shown in FIG. 2.

The distance information obtaining unit 1102 obtains the distance information of the piled target works 210 shown in FIG. 2. FIG. 2 shows an example of the arrangement of the image capturing unit 1101 and the distance information obtaining unit 1102. That is, the image capturing unit 1101 is formed from a global camera 201 in FIG. 2. The distance information obtaining unit 1102 is formed from the global camera 201 and a global projector 202. The distance information calculation method will be described later.

The three-dimensional position and orientation measurement unit 1103 detects a plurality of picking candidate works from the piled target works 210 based on the visible image captured by the image capturing unit 1101 and the distance information obtained by the distance information obtaining unit 1102. The three-dimensional position and orientation measurement unit 1103 then measures the three-dimensional positions and orientations of the plurality of detected picking candidate works to generate three-dimensional position and orientation information. The three-dimensional position and orientation measurement method will be described later.

The picking target work selection unit 1104 selects a work to be picked from the plurality of picking candidate works measured by the three-dimensional position and orientation measurement unit 1103.

During the picking operation of the picking unit 1106, the tracking unit 1105 tracks the coarse position/orientation of each of the candidate works other than the picking target work selected by the picking target work selection unit 1104, based on the three-dimensional position and orientation information measured by the three-dimensional position and orientation measurement unit 1103. The tracking method will be described later.

The picking unit 1106 operates, for example, a robot arm 203 shown in FIG. 2 based on the work picking point information obtained from the database 1200, the three-dimensional position and orientation information measured by the three-dimensional position and orientation measurement unit 1103, or the coarse position/orientation information of each work tracked by the tracking unit 1105, thereby picking the work selected by the picking target work selection unit 1104.

The procedure of processing of the object gripping apparatus according to the first embodiment will be described next with reference to the flowchart of FIG. 3.

In step S301, the image capturing unit 1101 captures the piled target works 210 using the global camera 201.

Figure 4A:
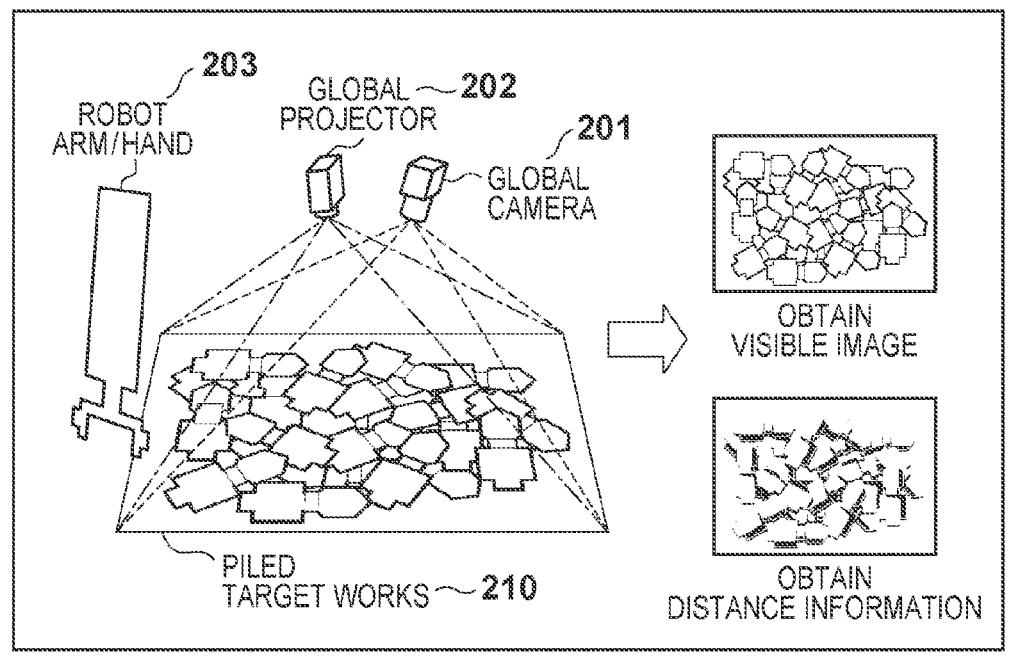
FIGS. 4A to 4C are schematic views showing processing of the object gripping apparatus according to the first embodiment.

In step S302, the distance information obtaining unit 1102 obtains the distance information of the whole piled target works 210. The distance information obtaining method is not particularly limited. For example, the distance information can be obtained by active stereo measurement that time-serially projects a binary fringe pattern to divide the measurement space and thus obtains the distance information of a target region, as described in Kousuke Satou and Seiji Inokuchi, "Liquid crystal range finder. High speed range imaging system using liquid crystal shutter", IEICE Transactions J71-D, No. 7, pp. 1249-1257, 1988-7. In the arrangement example shown in FIG. 2, the global projector 202 projects a binary fringe pattern to the piled target works 210. Then, the global camera 201 captures the piled target works 210 on which the binary fringe pattern is projected. This allows to obtain a distance image that holds distance information to the piled target works 210 for each pixel. FIG. 4A is a schematic view of visible image/distance information obtaining. The global camera 201 captures the piled target works 210 to obtain a visible image. In addition, the global camera 201 captures the piled target works 210 on which the binary fringe pattern is projected by the global projector 202, thereby obtaining distance information, as described above.

Figure 4B:
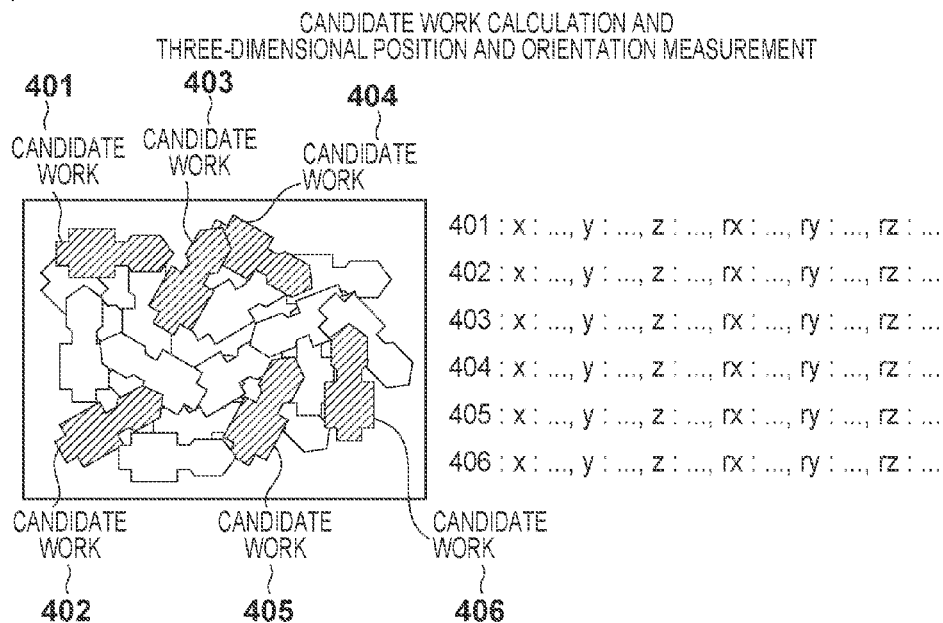

In step S303, the three-dimensional position and orientation measurement unit 1103 detects the coarse positions/orientations of a plurality of picking candidate works from the piled target works 210 using the visible image obtained in step S301. The three-dimensional position and orientation of each picking candidate work are measured using the detected coarse position/orientation information and the distance information obtained in step S302. This step aims at detecting the three-dimensional positions and orientations of the plurality of picking candidate works. The measurement can be done using an arbitrary existing method. For example, Japanese Patent Laid-Open No. 2009-128201 proposes a method of estimating the coarse position/orientation of a target work using linear bright region information extracted from a visible image and estimating the three-dimensional position and orientation using the estimation result and distance information. FIG. 4B is a schematic view showing candidate work detection and three-dimensional position and orientation measurement. As shown in FIG. 4B, six candidate works indicated by hatched portions are detected from the obtained visible image. The three-dimensional position and orientation information (position: x,y,z, orientation: rx,ry,rz) of each detected candidate work is measured, as shown on the right side of FIG. 4B. The six candidate works are candidate works 401 to 406.

In step S304, the three-dimensional position and orientation measurement unit 1103 determines whether there exist one or more candidate works whose three-dimensional positions and orientations are detected in step S303. The process advances to step S305 upon determining that one or more candidate works exist (YES in step S304). The processing ends upon determining that no candidate work exists (NO in step S304).

Figure 4C:
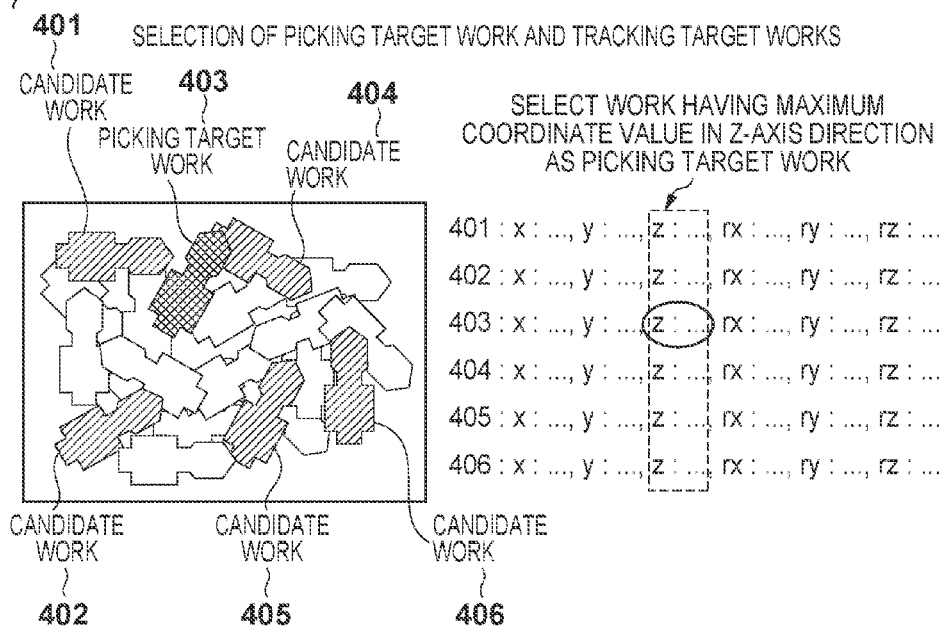

In step S305, the picking target work selection unit 1104 selects one picking target work from the candidate works detected in step S303, based on the three-dimensional position and orientation information measured by the three-dimensional position and orientation measurement unit 1103 and a selection condition set for each three-dimensional position and orientation information. The candidate works other than the selected picking target work are set as tracking target works. The picking target work selection unit 1104 selects the picking target work based on the three-dimensional position and orientation information of each candidate work measured in step S303. In this embodiment, the candidate works are sequentially picked from the top of the pile. The target can easily be estimated from the depth information of the candidate works. FIG. 4C shows picking target work selection. By referring to the z-coordinate value of the three-dimensional position and orientation information of each candidate work, the candidate work located at the highest position is selected as the picking target work. In FIG. 4C, the picking target work selection unit 1104 selects the candidate work 403 as the picking target work out of the six candidate works detected in step S303. The remaining candidate works 401, 402, and 404 to 406 are selected as tracking target works. Note that the picking target work selection condition can be set freely. For example, the target works may be picked sequentially in the order of easiness of picking by the arm. More specifically, the selection condition may be set to sequentially select a target work whose predetermined picking point position and normal direction match a predetermined position and direction based on the three-dimensional position and orientation information measured in step S303. Alternatively, the selection condition may be set to select a target work closer to the center of the piled works or closer to the reference position and orientation of the robot arm.

In step S306, the tracking unit 1105 starts tracking processing of the tracking target works after the robot arm has moved to above the picking target work selected in step S305 so as to be ready for picking. Note that tracking means processing of time-serially obtaining the image of the region including the piled target works 210 during picking and continuously estimating and updating the three-dimensional positions and orientations of the tracking target works from the obtained image. For example, the three-dimensional positions and orientations of the tracking target works are updated at a predetermined time interval. In this embodiment, the edges of CAD models of target works registered in the database 1200 are associated on the image, and the projection error is minimized, thereby performing tracking processing. At this time, the distance information is not used.

Note that interference between the arm and works or between works upon picking readily occurs for the works around the picking target work. For this reason, the tracking target works located on the periphery of the picking target work are supposed to easily vary their positions and orientations. Out of the tracking target works, only works on the periphery of the picking target work may undergo the tracking processing to reduce the calculation cost. The periphery may be, for example, a predetermined range from the picking target work.

In step S307, the picking unit 1106 controls picking processing of the picking target work in parallel to the tracking processing in step S306. The picking unit 1106 grips the predetermined picking point of the picking target work and moves it to a predetermined position. The next picking target work is selected from the works that have succeeded tracking.

Note that the tracking target work may be absent after the tracking processing is completed due to some reason when, for example, the track of a tracking target work is lost because of a tracking failure, or only one candidate work is measured in step S303.

Hence, in step S308, the picking target work selection unit 1104 determines whether a tracking target work exists. Upon determining that a tracking target work exists (YES in step S308), the process returns to step S305 to select the next picking target work. Upon determining that no tracking target work exists (NO in step S308), the process returns to step S301 to execute the processing of obtaining the visible image and distance information of the piled candidate works again.

Three-dimensional position and orientation estimation by tracking is done without using the distance information. For this reason, if the initial position and orientation of a tracking target work vary during picking, the accuracy of three-dimensional position and orientation estimation processing by tracking is assumed to be lower than the accuracy of three-dimensional position and orientation measurement processing in step S303. If a candidate work whose position and orientation have been measured using the distance information and a candidate work estimated by tracking are mixed, the candidate work measured using the distance information may preferentially be picked in the picking target work selection processing in step S305. For example, the selection condition may be set to, when picking the candidate works sequentially from the top of the pile, pick the work on the top of the pile out of the candidate works measured using the distance information. In addition, the selection condition may be set to, if no candidate work measured using the distance information exists, pick a candidate work estimated by tracking processing.

Alternatively, precise three-dimensional position and orientation measurement may be executed again after the picking processing. When it is determined in step S308 that a tracking target work exists, and it has varied the three-dimensional position and orientation from those measured in step S303, the distance information is obtained again only for the tracking target work and its periphery, thereby measuring the three-dimensional position and orientation. The periphery may be a predetermined range including the tracking target work. In this case as well, using the three-dimensional position and orientation information by tracking processing makes it possible to perform high-speed measurement as compared to three-dimensional position and orientation measurement for the entire piled target works 210.

In this way, the processing is repeated to pick the piled works until no more picking candidate work remains.

According to this embodiment, the positions and orientations of a plurality of candidate works are obtained at the time of candidate work detection. The pieces of position and orientation information of the plurality of candidate works are held independently of the presence/absence of interference between works or between works and the robot arm. This allows the time required for position and orientation measurement of the candidate works to be reduced and thus shorten the tact time necessary for picking the whole piled candidate works.

Second Embodiment

The second embodiment of the present invention will be described next. In the first embodiment, a plurality of candidate works are detected, and the candidate works other than a picking target work are tracked, thereby holding the position and orientation information of the plurality of candidate works. This reduces the calculation time required to perform three-dimensional position and orientation measurement in each picking operation. In the picking operation, however, when the robot arm exists between the global camera and a tracking target work, and the three-dimensional position and orientation of the shielded tracking target work vary, it may be impossible to track the position and orientation of the tracking target work.

In this embodiment, the picking target work is selected so as to reduce tracking processing failures that occur when a tracking target work is shielded by the robot arm during picking processing. This aims at suppressing losing the track of a candidate work due to a tracking failure.

Figure 5:
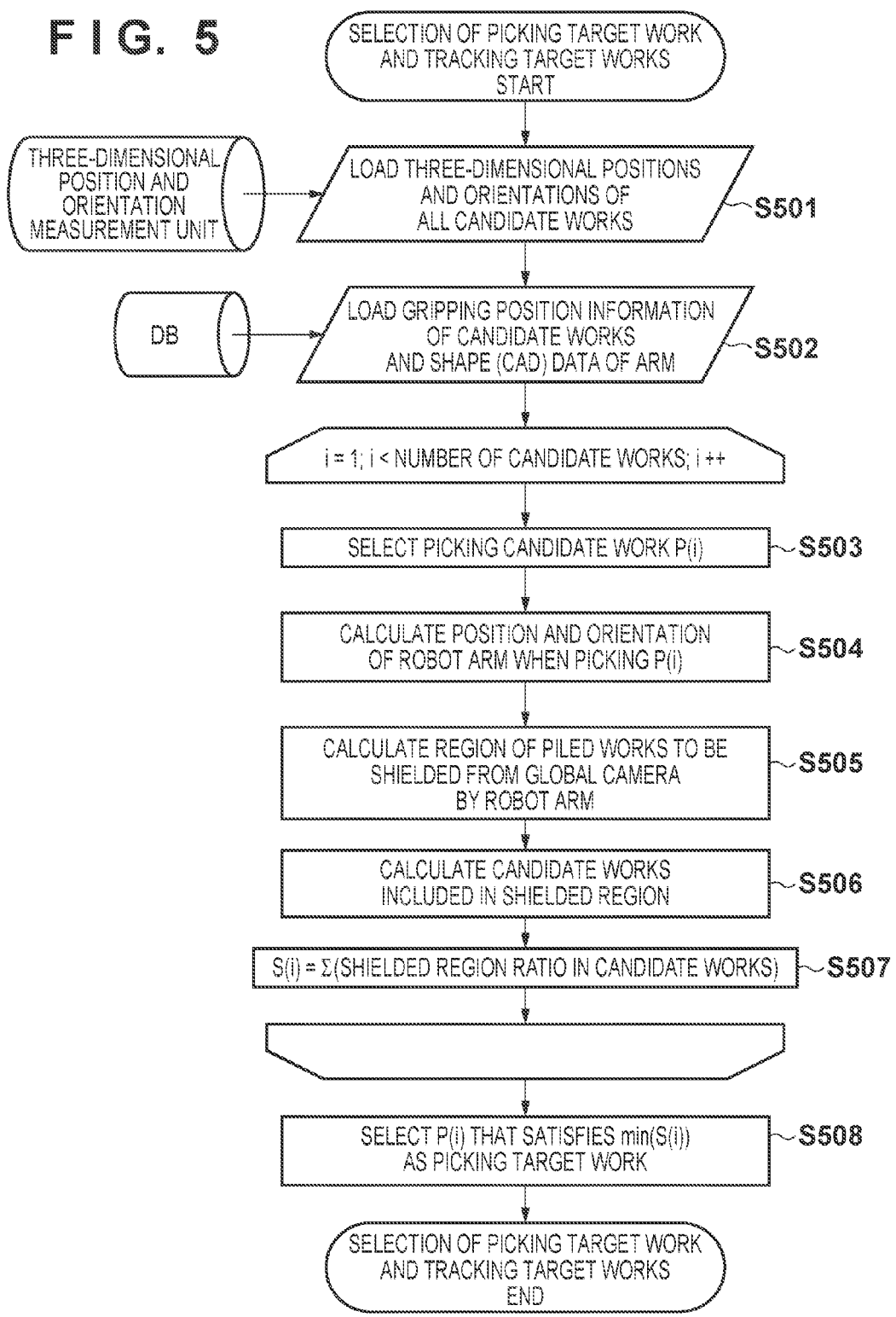
FIG. 5 is a flowchart illustrating the procedure of processing of a picking target work selection algorithm according to the second embodiment.

The arrangement of the object gripping apparatus is the same as in the first embodiment, and a description thereof will be omitted. In this embodiment, the picking target work is selected such that the tracking failure ratio lowers. Hence, the algorithm for selecting the picking target work and tracking target works in S305 of FIG. 3 will be explained with reference to FIG. 5.

First, necessary data are obtained in advance.

In step S501, a picking target work selection unit 1104 obtains the three-dimensional position and orientation information of a plurality of candidate works measured by a three-dimensional position and orientation measurement unit 1103.

In step S502, the picking target work selection unit 1104 obtains the picking point information of the candidate works, the three-dimensional position and orientation information of the global camera, the CAD data of the robot arm, and the CAD data of the work, which are prepared in a database 1200 in advance. CAD data is the three-dimensional geometric information of the robot arm or the work.

The processes of steps S503 to S507 are repetitively executed as many times as the number N of detected candidate works.

In step S503, the picking target work selection unit 1104 selects an arbitrary work P(i) (i=1 to N) as the picking candidate work.

Figure 6A:
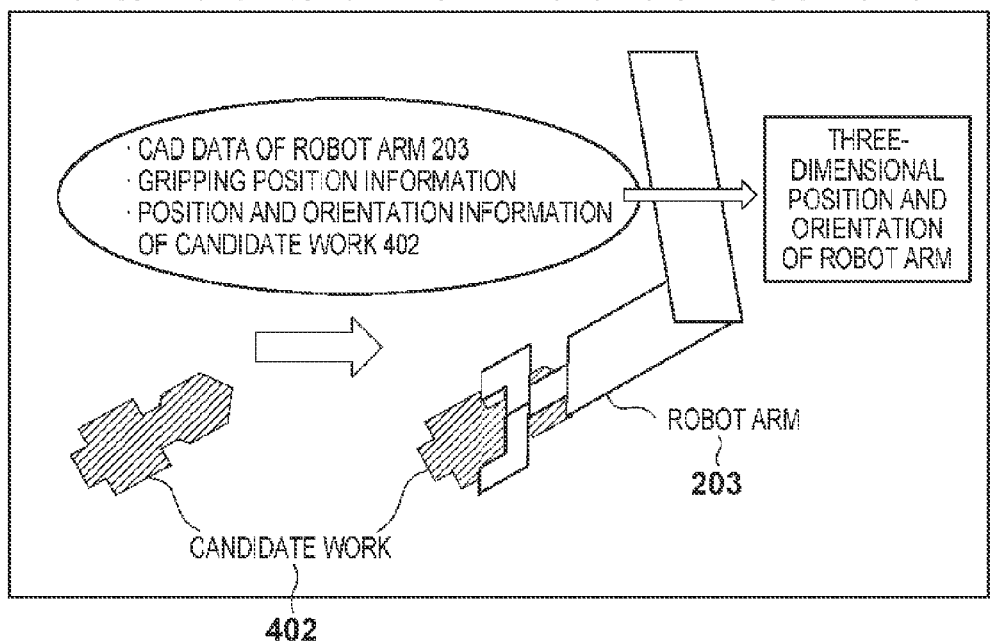
FIG. 6A is a view showing an example in which a candidate work 402 is selected as a picking candidate.

In step S504, the picking target work selection unit 1104 calculates, based on the gripping position information of the candidate works and the three-dimensional position and orientation information of the work P(i), the three-dimensional position and orientation of the robot arm when picking the work P(i). FIG. 6A illustrates an example in which a candidate work 402 is selected as the picking candidate. The picking target work selection unit 1104 calculates, based on the position and orientation information of the candidate work 402, the gripping position information of the works, and the CAD data of the robot arm, the three-dimensional position and orientation of the robot arm when picking the candidate work 402.

In step S505, the picking target work selection unit 1104 obtains, based on the image obtained by the global camera, a region of the image region to be shielded by the robot arm at the time of picking, and detects candidate works included in the shielded region. More specifically, based on the three-dimensional position and orientation information of the robot arm calculated in step S504, the CAD data of the robot arm, and the three-dimensional position and orientation information of the global camera, the picking target work selection unit 1104 obtains a portion of the piled work region, which is to be shielded from the global camera by the robot arm. In addition, the picking target work selection unit 1104 detects candidate works included in the shielded region using the three-dimensional position and orientation information of the plurality of candidate works measured by the three-dimensional position and orientation measurement unit 1103.

Figure 6B:
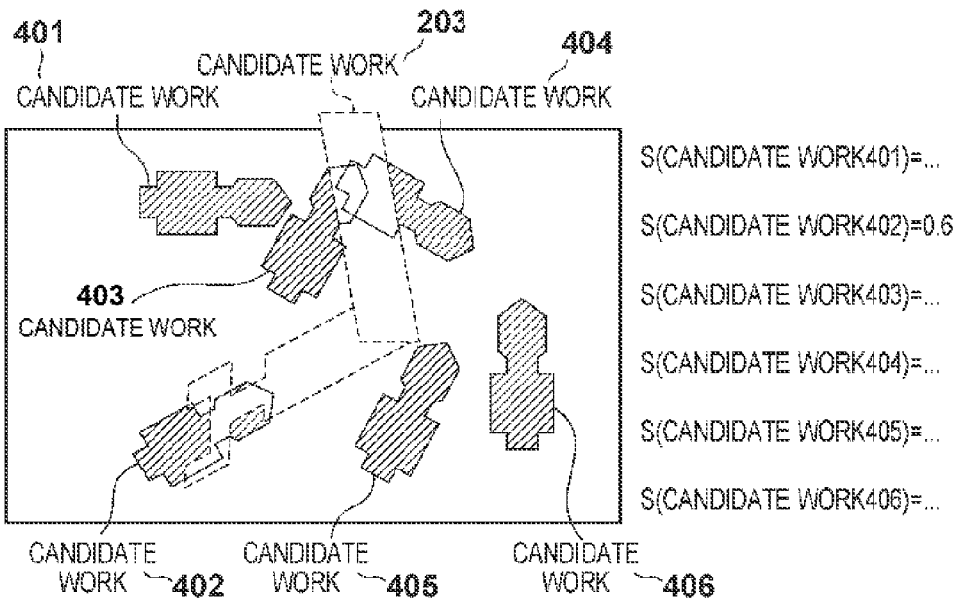
FIG. 6B is a view showing an example of processing of steps S505 and S506 when the candidate work 402 is selected.

In step S506, the picking target work selection unit 1104 obtains the ratio of the shielded region on the candidate works detected in step S505, based on the image obtained by the global camera. The ratio (shielding ratio) of the shielded region to the surface area of the candidate works on the two-dimensional image is calculated. Let S(i) be the sum of the shielding ratios of all candidate works except the work i when picking the work i. FIG. 6B illustrates an example of processing of steps S505 and S506 when the candidate work 402 is selected. In step S505, the positional relationship between the global camera, the robot arm, and the candidate works is calculated from their three-dimensional position and orientation information, thereby detecting candidate works to be shielded when observed from the global camera. As can be seen from FIG. 6B, when picking the candidate work 402, a robot arm 203 shields part of candidate works 403 and 404. In step S506, S (candidate work 402) is obtained. S (candidate work 402) is obtained from the sum of the shielding ratios of candidate works 401 and 403 to 406. In FIG. 6B, the shielding ratios of the candidate works 401, 405, and 406 are 0 because they are not shielded by the robot arm 203. On the other hand, the shielding ratios of the candidate works 403 and 404 can be calculated from the CAD data and three-dimensional position and orientation information of the robot arm and the works. For example, when the shielding ratio of the candidate work 403 is 20%, and the shielding ratio of the candidate work 404 is 40%, S (candidate work 402)=0+0.2+0.4+0+0=0.6.

S(i) is calculated for the N candidate works in this way. In step S507, the picking target work selection unit 1104 selects the candidate work P(i) having the minimum value S(i) as the picking target work. If there are a plurality of candidate works having the same value S(i), the work on the top of the pile is selected, as in the first embodiment.

According to this embodiment, it is possible to decrease the number of tracking target works to be shielded by the robot arm upon picking so as to be unobservable from the global camera. In addition, decreasing the number of works that fail in tracking allows the number of times three-dimensional position and orientation measurement processing is executed to be reduced.

Third Embodiment

The third embodiment of the present invention will be described. When picking piled works, the picking target work itself may move due to, for example, interference with the robot arm before it grips the picking target work. In such a case, picking fails at a high probability. In this embodiment, tracking processing is performed not only for the tracking target works but also for the picking target work to update the position and orientation information up to the moment just before picking processing. This allows to correctly transit to repicking processing and thus prevent a picking failure even when the position and orientation of the picking target work vary during picking.

The procedure of processing of an object gripping apparatus according to this embodiment will be described with reference to the flowchart of FIG. 3. In this embodiment, the processing procedure is different in steps S305 and S306 of the flowchart in FIG. 3, and these steps will particularly be described in detail.

The processes of steps S301 to S304 are the same as in the first embodiment.

In step S305, a picking target work selection unit 1104 selects the picking target work and tracking target works from the candidate works detected in step S303. When tracking the picking target work, it needs to be included in the field of view of the global camera. Hence, the picking target work is preferably not shielded by the robot arm when observed from the global camera. In this embodiment, the picking target work is selected based on the shielding ratio of the robot arm, as in the second embodiment. The procedure of processing is the same as described in the second embodiment. In the second embodiment, the sum S(i) of the shielding ratios is calculated based on the shielding ratios of (N−1) works except the picking target work i. In the third embodiment, however, the sum of the shielding ratios is calculated based on the shielding ratios of N works including the picking target work i. A weight may be added to the shielding ratio of the picking target work i so that the work i is hardly shielded.

In step S306, a tracking unit 1105 starts tracking the tracking target works and the picking target work. At this time, tracking of the picking target work selected in step S305 may be impossible because it is shielded by the robot arm. In this case, only tracking of the tracking target works is executed in step S306 so that the object gripping apparatus operates as in the first embodiment.

In step S307, a picking unit 1106 picks the picking target work. The procedure of processing when the picking target work is successfully tracked in step S306 will be explained with reference to the flowchart of FIG. 7.

In step S701, the picking unit 1106 starts picking processing of the picking target work.

In step S702, the picking unit 1106 determines whether the position and orientation of the picking target work have varied before completion of picking. Upon determining that the position and orientation of the picking target work have varied before completion of picking (YES in steps S702), the process advances to step S703. Upon determining that the position and orientation of the picking target work have not varied before completion of picking (NO in steps S702), that is, no variation has occurred during picking, the process advances to step S706.

In step S703, the picking unit 1106 determines whether tracking of the picking target work whose position and orientation have varied has succeeded. Upon determining that tracking of the picking target work has succeeded (YES in step S703) the process advances to step S704. Upon determining that tracking of the picking target work has failed (NO in step S703), the process advances to step S705.

In step S704, the picking unit 1106 updates the position and orientation information of the picking target work to that obtained by tracking, and the process returns to step S701.

In step S705, the picking unit 1106 excludes the current picking target work from the candidate works because picking is impossible due to loss of position and orientation information, and ends the picking processing end.

In step S706, the picking unit 1106 grips the picking target work, moves it to a predetermined position, and ends the picking processing.

The process of step S308 is the same as in the first embodiment, and a description thereof will be omitted.

According to this embodiment, tracking the picking target work enables to suppress a picking failure caused by a variation in the position and orientation of the picking target work at the time of picking.

According to the present invention, it is possible to reduce the influence of a variation in the position and orientation of a work caused by interference upon picking.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279868, filed on Dec. 15, 2010, which is hereby incorporated by reference herein in its entirety.

What is claimed is:

1. An information processing apparatus comprising:
   an obtaining unit adapted to obtain distance information of a region including a plurality of objects;
   a first selection unit configured to select a plurality of holding candidate objects from the plurality of objects based on the distance information;
   a measurement unit adapted to measure three-dimensional position and orientation information of the selected plurality of holding candidate objects based on the distance information;
   a second selection unit adapted to select a holding target object from the plurality of holding candidate objects and select one or more tracking target objects other than the selected holding target object from the plurality of holding candidate objects, based on the three-dimensional position and orientation information measured by said measurement unit;
   a controlling unit adapted to cause a holding unit to hold the holding target object; and
   an updating unit adapted to update the three-dimensional position and orientation information of the tracking target objects by obtaining a visible image including the tracking target objects at a predetermined time interval during holding of the holding target object by said holding unit without obtaining distance information newly, wherein the update by said updating unit is performed by a different method from the measurement by said measurement unit,
   wherein when the holding by said holding unit has ended, said second selection unit selects a next holding target object based on the three-dimensional position and orientation information of the tracking target objects updated by said updating unit, wherein the updating unit updates the three-dimensional position and orientation information of the tracking target objects so that a difference between a position in the visible image where registered model data of the tracking target objects is projected to the position of the target tracking objects in the visible image decreases.

2. The apparatus according to claim 1, wherein
   when the holding by said holding unit has ended, and the three-dimensional position and orientation information of the tracking target objects updated by said updating unit have not varied from the three-dimensional position and orientation information of the tracking target objects measured by said measurement unit, said second selection unit selects the next holding target object from the tracking target objects based on the three-dimensional position and orientation information measured by said measurement unit without obtaining distance information newly.

3. The apparatus according to claim 1, wherein
when the holding by said holding unit has ended and the three-dimensional position and orientation information of the tracking target objects updated by said updating unit have varied from the three-dimensional position and orientation information of the tracking target objects measured by said measurement unit, said obtaining unit obtains distance information in the predetermined range including the target objects anew, based on the three-dimensional position and orientation information of the tracking target objects updated by said updating unit, said measurement unit measures the three-dimensional positions and orientations of the tracking target objects anew based on the distance information and generates three-dimensional position and orientation information anew, and said second selection unit selects the next holding target object from the tracking target objects based on the anew measured three-dimensional position and orientation information.

4. The apparatus according to claim 1, further comprising:
a storage unit adapted to store three-dimensional geometric information of said holding unit; and
a calculation unit adapted to calculate, based on the three-dimensional geometric information stored in said storage unit, for each holding target object, a shielding ratio representing a ratio of an area of the holding candidate objects shielded by said holding unit to an area of the holding candidate objects when not shielded by said holding unit,
wherein said second selection unit selects the holding target object from the holding candidate objects, based on the three-dimensional position and orientation information measured by said measurement unit and the shielding ratio.

5. The apparatus according to claim 4, wherein said second selection unit selects, as the holding target object, a holding candidate object with the smallest shielding ratio.

6. The apparatus according to claim 1, wherein said updating unit updates the three-dimensional positions and orientations of the holding candidate objects that exist within a predetermined range from the holding target object.

7. The apparatus according to claim 1, further comprising a unit adapted to obtain a visible image including the plurality of objects;
wherein said measurement unit measures the three-dimensional positions and orientations of the holding candidate objects based on the visible image and the distance information.

8. The apparatus according to claim 1, wherein said updating unit obtains the image data of the tracking target objects without obtaining distance information of the tracking target objects anew.

9. A method of controlling an information processing apparatus, the method comprising:
obtaining distance information of a region including a plurality of objects;
selecting a plurality of holding candidate objects from the plurality of objects based on the distance information;
measuring three-dimensional position and orientation information of the selected plurality of holding candidate objects based on the distance information;
selecting a holding target object from the plurality of holding candidate objects and select one or more tracking target objects other than the selected holding target object from the plurality of holding candidate objects, based on the three-dimensional position and orientation information measured in the measuring;
holding the holding target object; and
updating the three-dimensional position and orientation information of the tracking target objects by obtaining a visible image including the tracking target objects at a predetermined time interval during holding of the holding target object in the gripping without obtaining distance information newly, wherein the updating is performed by a different method from the measurement,
wherein in the selecting, when the holding in the holding step has ended, a next holding target object is selected based on the three-dimensional position and orientation information of the tracking target objects updated in the updating, wherein in the updating, the three-dimensional position and orientation information of the tracking target objects is updated so that a difference between a position in the visible image where registered model data of the tracking target objects is projected to the position of the target tracking objects in the visible image decreases.

10. A non-transitory computer-readable storage medium storing a computer program that causes a computer to execute steps of an object gripping apparatus control method, the method comprising:
obtaining distance information of a region including a plurality of objects;
selecting a plurality of holding candidate objects from the plurality of objects based on the distance information;
measuring three-dimensional position and orientation information of the selected plurality of holding candidate objects based on the distance information;
selecting a holding target object from the plurality of holding candidate objects and select one or more tracking target objects other than the selected holding target object from the plurality of holding candidate objects, based on the three-dimensional position and orientation information measured in the measuring;
holding the holding target object; and
updating the three-dimensional position and orientation information of the tracking target objects by obtaining a visible image including the tracking target objects at a predetermined time interval during holding of the holding target object in the gripping without obtaining distance information newly, wherein the updating is performed by a different method from the measurement,
wherein in the selecting, when the holding in the holding step has ended, a next holding target object is selected based on the three-dimensional position and orientation information of the tracking target objects updated in the updating, wherein in the updating, the three-dimensional position and orientation information of the tracking target objects is updated so that a difference between a position in the visible image where registered model data of the tracking target objects is projected to the position of the target tracking objects in the visible image decreases.

11. An object gripping apparatus comprising:
an image capturing unit adapted to capture an image of a region including a plurality of objects;
an obtaining unit adapted to obtain distance information of the region including the plurality of objects;
a measurement unit adapted to measure three-dimensional positions and orientations of a plurality of holding candidate objects out of the plurality of objects based on the image and the distance information, thereby generating three-dimensional position and orientation information;
a selection unit adapted to select a holding target object from the holding candidate objects based on the three-dimensional position and orientation information measured by said measurement unit;
a holding unit adapted to hold the holding target object; and
an updating unit adapted to update the three-dimensional position and orientation information by measuring the three-dimensional positions and orientations of the holding candidate objects at a predetermined time interval during holding of the holding target object by said holding unit,
wherein when the holding by said holding unit has ended, said selection unit selects the next holding target object based on the three-dimensional position and orientation information of the holding candidate objects updated by said updating unit,
wherein when the holding by said holding unit has ended, and said updating unit determines that the three-dimensional positions and orientations of the holding candidate objects measured by said measurement unit have not varied,
said selection unit selects the next holding target object based on the three-dimensional position and orientation information measured by said measurement unit.

12. The apparatus according to claim 11, wherein
said updating unit updates the three-dimensional position and orientation information by further measuring a three-dimensional position and orientation of the holding target object, and
if said updating unit determines that the three-dimensional position and orientation of the holding target object have varied before holding the holding target object, said holding unit holds the holding target object based on the three-dimensional position and orientation information of the holding target object updated by said updating unit.

13. The apparatus according to claim 11, wherein
when the holding by said holding unit has ended, and said updating unit determines that the three-dimensional positions and orientations of the holding candidate objects measured by said measurement unit have varied,
said image capturing unit captures an image in a predetermined range including the holding candidate objects based on the three-dimensional position and orientation information of the holding candidate objects updated by said updating unit,
said obtaining unit obtains distance information in the predetermined range anew,
said measurement unit measures the three-dimensional positions and orientations of the holding candidate objects anew based on the image and the distance information, and
said selection unit selects the next holding target object based on the anew measured three-dimensional position and orientation information.

14. The apparatus according to claim 11, further comprising:
a storage unit adapted to store three-dimensional geometric information of said gripping unit; and
a calculation unit adapted to calculate, based on the three-dimensional geometric information stored in said storage unit, a shielding ratio representing a ratio of an area of the holding candidate objects shielded by said holding unit to an area of the holding candidate works when not shielded by said holding unit,
wherein said selection unit selects the holding target object from the holding candidate objects in ascending order of the shielding ratio based on the three-dimensional position and orientation information measured by said measurement unit.

15. An object gripping method comprising:
an image capturing unit adapted to capture an image of a region including a plurality of objects;
an obtaining unit adapted to obtain distance information of the region including the plurality of objects;
a measurement unit adapted to measure three-dimensional positions and orientations of a plurality of holding candidate objects out of the plurality of objects based on the image and the distance information, thereby generating three-dimensional position and orientation information;
a selection unit adapted to select a holding target object from the holding candidate objects based on the three-dimensional position and orientation information measured by said measurement unit;
a holding unit adapted to hold the holding target object; and
an updating unit adapted to update the three-dimensional position and orientation information by measuring the three-dimensional positions and orientations of the holding candidate objects at a predetermined time interval during holding of the holding target object by said holding unit,
wherein when the holding by said holding unit has ended, said selection unit selects the next holding target object based on the three-dimensional position and orientation information of the holding candidate objects updated by said updating unit,
wherein when the holding by said holding unit has ended, and said updating unit determines that the three-dimensional positions and orientations of the holding candidate objects measured by said measurement unit have not varied,
said selection unit selects the next holding target object based on the three-dimensional position and orientation information measured by said measurement unit.

16. An object gripping storage medium comprising:
an image capturing unit adapted to capture an image of a region including a plurality of objects;
an obtaining unit adapted to obtain distance information of the region including the plurality of objects;
a measurement unit adapted to measure three-dimensional positions and orientations of a plurality of holding candidate objects out of the plurality of objects based on the image and the distance information, thereby generating three-dimensional position and orientation information;
a selection unit adapted to select a holding target object from the holding candidate objects based on the three-dimensional position and orientation information measured by said measurement unit;
a holding unit adapted to hold the holding target object; and
an updating unit adapted to update the three-dimensional position and orientation information by measuring the three-dimensional positions and orientations of the holding candidate objects at a predetermined time interval during holding of the holding target object by said holding unit,
wherein when the holding by said holding unit has ended, said selection unit selects the next holding target object based on the three-dimensional position and orientation information of the holding candidate objects updated by said updating unit,
wherein when the holding by said holding unit has ended, and said updating unit determines that the three-dimensional positions and orientations of the holding candidate objects measured by said measurement unit have not varied,
said selection unit selects the next holding target object based on the three-dimensional position and orientation information measured by said measurement unit.

\* \* \* \* \*